United States Patent [19]
Wakabayashi et al.

[11] Patent Number: 4,809,343
[45] Date of Patent: Feb. 28, 1989

[54] MAXIMUM/MINIMUM VALUE CONVERSION CIRCUIT FOR IMAGE PROCESSING

[75] Inventors: Shuichi Wakabayashi; Tetsumi Kawamoto; Toshiyuki Yamada; Yuko Murayama, all of Tokyo, Japan

[73] Assignee: Seiko Instruments Inc., Tokyo, Japan

[21] Appl. No.: 99,113

[22] Filed: Sep. 21, 1987

[30] Foreign Application Priority Data

Oct. 31, 1986 [JP] Japan .................. 61-259934

[51] Int. Cl.$^4$ ............................................ G06K 9/56
[52] U.S. Cl. .................................. 382/27; 382/48; 382/53
[58] Field of Search ............ 382/48, 53, 51, 16, 382/27; 364/581, 582

[56] References Cited

U.S. PATENT DOCUMENTS

| | | | |
|---|---|---|---|
| 4,297,676 | 10/1981 | Moriya et al. | 382/53 |
| 4,446,486 | 5/1984 | Itoh | 382/53 |
| 4,504,969 | 3/1985 | Suzuki et al. | 382/48 |
| 4,630,307 | 12/1986 | Cok | 382/27 |
| 4,633,327 | 12/1986 | Roetling | 382/53 |

*Primary Examiner*—Leo H. Boudreau
*Assistant Examiner*—Joseph Marcuso
*Attorney, Agent, or Firm*—Spensley Horn Jubas & Lubitz

[57] ABSTRACT

A circuit for processing a maximum value conversion and a minimum value conversion of a digital image data to extract the feature of the image. A range N×N of the image data is processed by a simple circuit construction which comprises a horizontal row maximum value selection circuit for selecting the maximum value along N data and N numbers of maximum value selection circuits for comparing N vertical column data with the output data of the horizontal row maximum value selection circuit.

7 Claims, 9 Drawing Sheets

| P(511,0) | P(511,1) | P(511,2) | P(511,3) | P(511,4) | P(511,5) | P(511,6) | --- | P(511,511) |
|---|---|---|---|---|---|---|---|---|

| P(6,0) | P(6,1) | P(6,2) | P(6,3) | P(6,4) | P(6,5) | P(6,6) | P(6,511) |
|---|---|---|---|---|---|---|---|
| P(5,0) | P(5,1) | P(5,2) | P(5,3) | P(5,4) | P(5,5) | P(5,6) | P(5,511) |
| P(4,0) | P(4,1) | P(4,2) | P(4,3) | P(4,4) | P(4,5) | P(4,6) | P(4,511) |
| P(3,0) | P(3,1) | P(3,2) | P(3,3) | P(3,4) | P(3,5) | P(3,6) | P(3,511) |
| P(2,0) | P(2,1) | P(2,2) | P(2,3) | P(2,4) | P(2,5) | P(2,6) | P(2,511) |
| P(1,0) | P(1,1) | P(1,2) | P(1,3) | P(1,4) | P(1,5) | P(1,6) | P(1,511) |
| P(0,0) | P(0,1) | P(0,2) | P(0,3) | P(0,4) | P(0,5) | P(0,6) | P(0,511) |

Fig. 13

| 1 | 2 | 3 | 4 | 5 |
|---|---|---|---|---|
| 6 | 5 | 2 | 1 | 3 |
| 4 | 7 | 3 | 1 | 1 |
| 7 | 8 | 6 | 3 | 5 |

Fig. 14

| 254 | 253 | 252 | 251 | 250 |
|---|---|---|---|---|
| 249 | 250 | 253 | 254 | 252 |
| 251 | 248 | 252 | 254 | 254 |
| 248 | 247 | 249 | 252 | 250 |

Fig. 15

| × | × | × | × | × |
|---|---|---|---|---|
| × | 254 | 254 | 254 | × |
| × | 253 | 254 | 254 | × |
| × | × | × | × | × |

Fig. 16

| × | × | × | × | × |
|---|---|---|---|---|
| × | 1 | 1 | 1 | × |
| × | 2 | 1 | 1 | × |
| × | × | × | × | × |

MAXIMUM/MINIMUM VALUE CONVERSION CIRCUIT FOR IMAGE PROCESSING

BACKGROUND OF THE INVENTION

1. Field of The Invention

This invention relates to a circuit which is directed to the image conversion of digital images inputted from imaging means such as an area sensor and digital images formed by a computer, or the like.

2. Description of The Prior Art

Maximum/minimum value conversion in a proximity region in multilevel digital image processing is a relatively effective technique as one of image conversion techniques because it can erase a specific region which is brighter than its surroundings by minimum value conversion in the case where a pixel value represents luminace, for example.

In accordance with the conventional technique, however, a plurality of conversion stages each consisting of a delay circuit, a plurality of proximity value hold circuits of a small scale matrix form such as $3 \times 3$, a maximum value selection circuit for selecting the maximum value among the values held by the proximity value hold circuits and a proximity center value conversion circuit for converting a proximity center value by the signal outputted from the maximum value selection circuit are arranged in series, conversion of a small scale proximity region is effected at each of these stages while conversion of a large proximity region throughout a series of the stages is effected, or conversion is repeatedly made at a single stage to obtain the same conversion result as above.

In order to make large proximity region conversion by repetition of small scale conversion such as $3 \times 3$ in the conventional circuit, however, an extremely long conversion time is necessary, and if a circuit capable of large proximity region conversion or a large number of small scale conversion circuits are connected in series in a plurality of stages in order to shorten the conversion time, the circuit becomes inevitably great in scale.

SUMMARY OF THE INVENTION

It is an object of the present invention to provide a simplified circuit for maximum/minimum value conversion of image data.

It is another object of the present invention to provide a circuit which can be used both for a maximum value conversion and a minimum value conversion.

In the circuit construction employed in the present invention to accomplish the object described above, part of the output for outputting the signal corresponding to the value of a pixel positioned at the center of one column among the output signals of a vertical column extraction/delay circuit for extracting and outputting the signals corresponding to the values of pixels of one column having a predetermined length in a vertical direction of an image memory and part of the output for outputting the signal corresponding to the value of a pixel positioned at the center of one row among the signals of a horizontal row extraction circuit for extracting and outputting the signals corresponding to the values of pixels of one row having a predetermined length in a horizontal direction of the image memory output at the same timing a signal corresponding to the value of the pixel at the same position as that of the image memory, the horizontal row maximum value selection circuit described above compares mutually the signals corresponding to the values of the pixels among those signals outputted from the horizontal row extraction circuit and a plurality of maximum value selection circuits compare the signal corresponding to the pixel value among the output of the vertical column extraction/delay circuit with the output signal of the horizontal row maximum value selection circuit and select and output the maximum value among them. In this manner the present invention holds the signals corresponding to all the pixels of a predetermined proximity region in the same way as in the prior art technique but can make the same conversion using a simple construction without the necessity of selecting the maximum value among them and substituting to the proximity center. The present invention can accomplish also maximum/minimum value conversion of the image by the same conversion circuit by adding to the construction described above an input inversion/non-inversion circuit for inversing and non-inversing a serial data signal from the read circuit described above and an output inversion/non-inversion circuit for inversing and non-inversing the serial data signal from the conversion circuit.

To exhibit the action of the circuit described above, it will be assumed that the number of pixels of one row corresponding to the image memory and outputted from the horizontal row extraction circuit is $2n+1$ ($n \geq =0$) and the number of pixels of one column corresponding to the image memory and outputted from the vertical column extraction/delay circuit is $2n+1$ ($n \geq =0$). It will be assumed further that the pixel values outputted by the horizontal row extraction circuit at a certain timing are $H_1, H_2, \ldots, H_{2n+1}$ and the pixel values outputted by the vertical column extraction/delay circuit at a certain timing are $V_1, V_2, \ldots, V_{2n+1}$. Then, the outputs $O_1, O_2, \ldots, O_{2n+1}$ of the maximum value selection circuit are as follows:

$$O_1 = \text{MAX}(V_1, \text{MAX}(H_1, H_2, \ldots, H_{2n+1}))$$
$$O_2 = \text{MAX}(V_2, \text{MAX}(H_1, H_2, \ldots, H_{2n+1}))$$
$$\vdots$$
$$O_{2n+1} = \text{MAX}(V_{2n+1}, \text{MAX}(H_1, H_2, \ldots, H_{2n+1}))$$

Here, the operator MAX represents an operation of selecting the maximum value from the values given in the parenthesis.

It will be assumed further that the coordinates of a multi-level digital image having a horizontal pixel number x ($x \geq =1$) and a vertical pixel number y ($y \geq =1$) in the horizontal direction are i ($i > n$, $x-n-1 \geq =i$), its coordinates in the vertical direction are j ($j \geq =n$, $y-n-1 \geq =j$), the value of the pixel having such coordinates is P (i, j); then, the serial data stream described above is expressed by $$P_{(0,0)}, P_{(1,0)}, P_{(2,0)}, \ldots P_{(x-1, 0)}, P_{(0,1)}, P_{(1,1)}, \ldots, P_{(x-1, y-1)}$$

and the input inversion/non-inversion circuit and the output inversion/non-inversion circuit described above effect the non-inversion operation. Then, if conversion is made throughout the image as a whole, an arbitrary pixel value P(i, j) in the image memory is converted in the following way:

$$t_1 = \text{MAX}(P_{(i, j)}, \text{MAX}(P_{(i-n, j-n)}, P_{(i-n+1, j-n)}, \ldots, P_{(i, j-n)}, \ldots, P_{(i+n, j-n)}))$$

$$t_2 = \text{MAX}(t_1, \text{MAX}(P_{(i-n,j-n+1)}, P_{(i-n+1,j-n+1)}, \ldots, P_{(i,j-n+1)}, \ldots, P_{(i+n,j-n+1)}))$$

$$t_{2n+1} = \text{MAX}(t_{2n}, \text{MAX}(P_{(i-n,j+n)}, P_{(i-n+1,j+n)}, \ldots, P_{(i,j+n)}, \ldots, P_{(i+n,j+n)}))$$

Here, tk ($1 = <k = <2n+1$) represents the value to which $P_{(i,j)}$ is temporarily converted in the maximum value selection circuit described above. The value $t_{2n+1}$ becomes a value corresponding to $P_{(i,j)}$ after conversion. When this value is represented by $P'_{(i,j)}$ and the result of conversion is put together, it becomes as follows:

$$\begin{aligned}P'_{(i,j)} = \text{MAX}(&P_{(i,j)}, P_{(i-n,j-n)}, P_{(i-n+1,j-n)}, \\ &\ldots, P_{(i,j-n)}, \ldots, P_{(i+n,j-n)}, \\ &P_{(i-n,j-n+1)}, P_{(i-n+1,j-n+1)}, \ldots, \\ &P_{(i,j-n+1)}, \ldots, P_{(i+n,j-n+1)}, \\ &\vdots \\ &P_{(i-n,j+n)}, P_{(i-n+1,j+n)}, \ldots, \\ &P_{(i,j+n)}, \ldots, P_{(i+n,j+n)})\end{aligned}$$

This result represents that P'(i, j) is converted to the maximum value among the pixel values of the pixels within the range $(2n+1) \times (2n+1)$ with $P_{(i,j)}$ being the center.

When the serial data stream consisting of each pixel value of the image memory is logically inversed in the input inversion/non-inversion circuit described above and converted to 1's complement of the binary digital value expression of each pixel value, selection of the maximum value of the digital values in the 1's complement is equivalent to the selection of the minimum value of the original values. Accordingly, minimum value conversion can be made in the same circuit, too, by logically inversing the input serial data signal by the input inversion/non-inversion circuit to make conversion described above and logically inversing the serial data signal as the result of conversion by the output inversion/non-inversion circuit.

DETAILED DESCRIPTION OF THE PREFERRED EMBODIMENT

Figure 1:
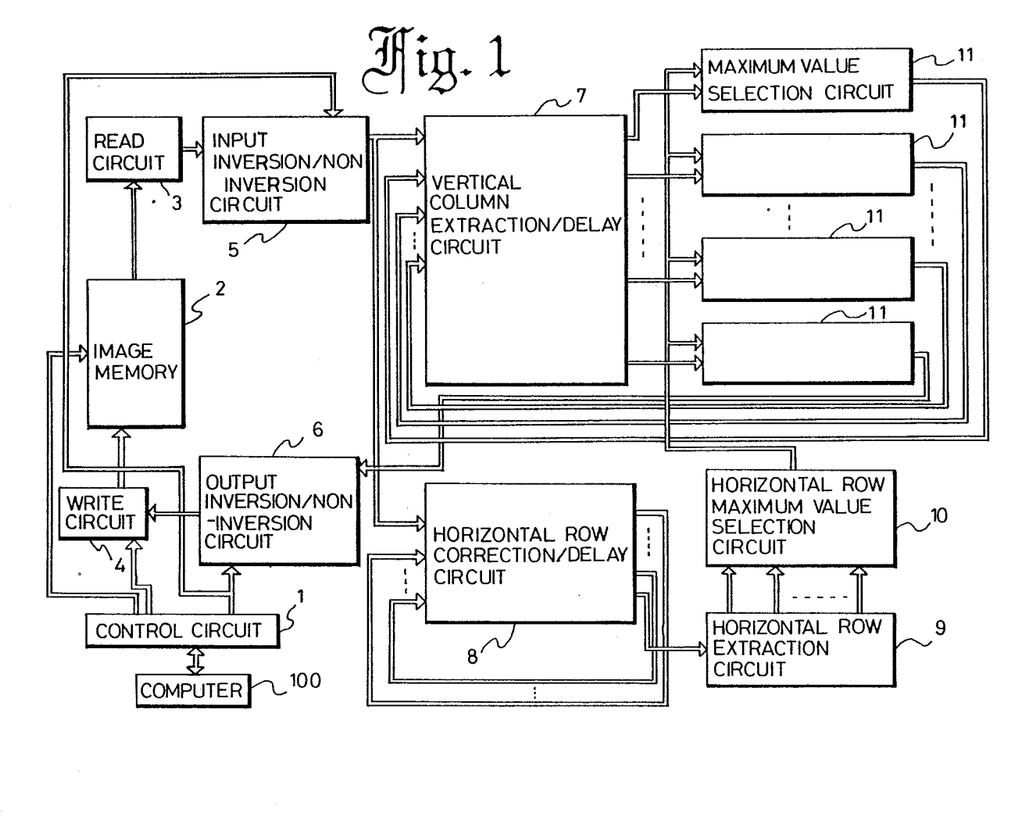
FIG. 1 is a block diagram showing an embodiment of the present invention.

Hereinafter, an embodiment of the present invention will be described with reference to the accompanying drawings. In FIG. 1, a control circuit 1 controls the circuit as a whole such as an image memory 2, inversion/non-inversion operations of an input inversion/non-inversion circuit 5 and output inversion/non-inversion circuit 6, address generation of the image memory 2 during conversion, generation of clocks at each circuit portion, and so forth, and makes interface with the computer 100.

The image memory 2 stores multilevel digital images before conversion and after conversion. In this embodiment, each pixel of the image has a value expressed by 8 bits, and the memory has 262,144 pixels having a matrix consisting of 512 pixels in a horizontal direction and 512 pixels in a vertical direction.

A read circuit 3 reads the image data of the image memory 2 in a word unit by the address generated by the control circuit 1 and converts and outputs them in a serial data signal of the type wherein each pixel has an 8-bit unit.

A write circuit 4 inputs the 8-bit unit serial data signal after conversion, puts them together in the word unit and writes the image memory 2 by the address generated by the control circuit 1.

The inversion/non-inversion input of the input inversion/non-inversion circuit 5 is connected to the control circuit 1 as shown in FIGS. 2-12, and this circuit 12 is inputted the serial data signal from the read circuit 3 and inverses/non-inverses and outputs this serial data signal by the inversion/non-inversion control signal.

The inversion/non-inversion control input of the output inversion/non-inversion circuit 6 is connected to the control circuit 1 as shown in in FIGS. 2—13, and this circuit 13 is inputted the serial data signal after conversion and inverses/non-inverses and outputs this serial data signal by the inversion/non-inversion control signal.

Maximum value conversion and minimum value conversion can be switched by the inversion/non-inversion control signal described above. A vertical column extraction/delay circuit 7 inputs the serial data signal from the input inversion/non-inversion circuit 5 and extracts the pixel values corresponding to a column having a predetermined length of the image. The circuit in this embodiment consists of three sets of shift registers as shown in FIGS. 3-14, and the number of shift stages is equal to the number of pixels of the image memory 2 in the horizontal direction in FIG. 1. The circuit 14 outputs continuously the values corresponding to three pixels of the image memory column.

A horizontal row extraction circuit 9 extracts the pixel value corresponding to one row of the image having a predetermined length. In this embodiment it consists of three stages of latches as shown in FIGS. 4-16 and continuously outputs the value corresponding to three pixels of the image memory.

A horizontal row correction/delay circuit 8 is inputted the serial data signal from the input inversion/non-inversion circuit 5 described above and delays the input serial data signal so that part of the output outputting the signal corresponding to the value of the pixel positioned at the center of one column among the signals corresponding to the values of the pixels of one column of a predetermined length outputted from the vertical column extraction/delay circuit 7 and part of the output outputting the signal corresponding to the value of the pixel positioned at the center of one row among the signals corresponding to the values of the pixels of one row of a predetermined length outputted by the horizontal extraction circuit 9 hold the signal corresponding to the value of the same pixel at the same timing. In this embodiment the circuit 8 consists of two sets of shift registers as shown in FIGS. 5-18.

A horizontal row maximum value selection circuit 10 is inputted the output of the horizontal row extraction circuit 9 and selects only the signal having the arithmetically largest value among the values expressed by the signals corresponding to the pixels that are outputted by the horizontal row extraction circuit 9.

In this embodiment the horizontal row maximum value selection circuit consists of digital comparators and multiplexers, as shown in FIGS. 4-17.

The maximum value selection circuit 11 inputs part of the output of the vertical column extraction/delay circuit 7 and the output of the horizontal row maximum value selection circuit, compares the value of the signal corresponding to the pixel outputted by the vertical column extraction/delay circuit 7 with the value of the signal outputted by the horizontal row maximum value selection circuit 10 and selects and outputs the signal having an arithmetically larger value. In this embodiment the maximum value selection circuit 11 consists of a digital comparator and a multiplexer as shown in FIGS. 3-15.

Figure 6:
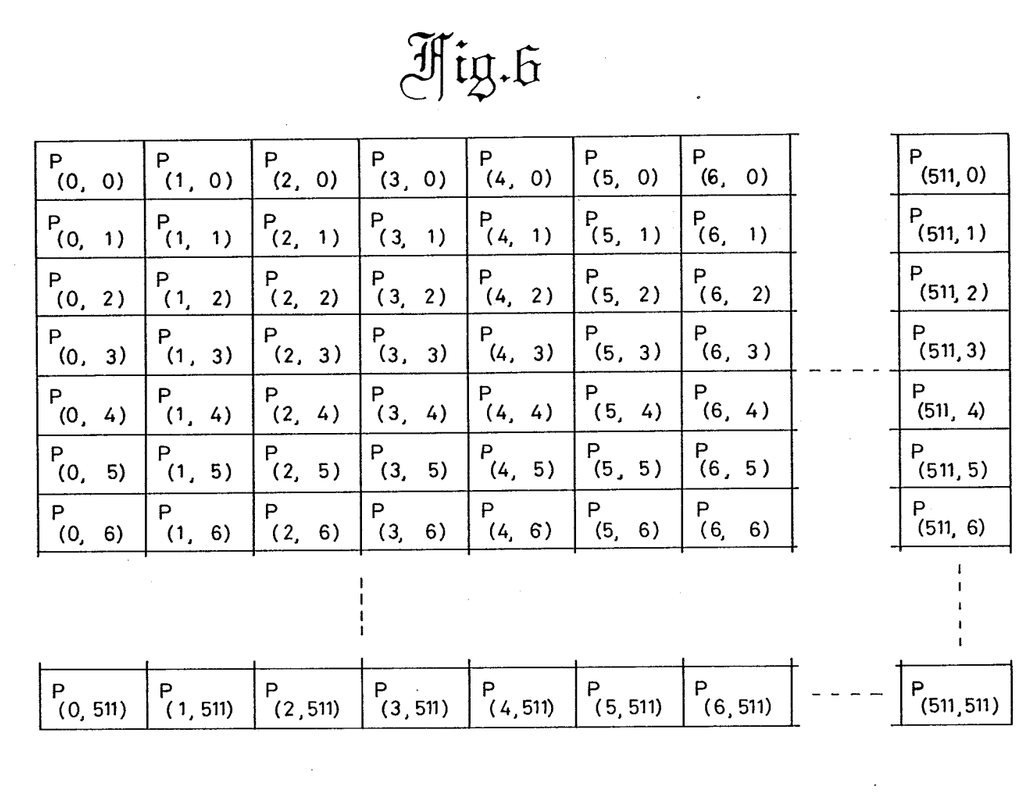
FIG. 6 shows conceptually the state of an image memory in the of the embodiment of the present invention.

Next, the operation of this circuit will be explained with reference to the drawings. FIG. 6 shows schematically the status of the image memory 2 before conversion. The value of each pixel in the drawing is expressed by $P_{(i,j)}$ and (i,j) represents its coordinates.

Figure 7:
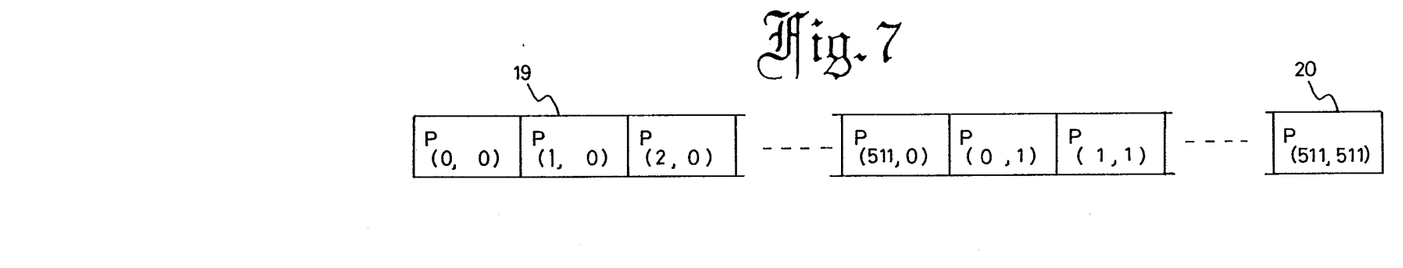
FIG. 7 shows conceptually a serial data signal in the embodiment of the present invention.

FIG. 7 shows the serial data stream outputted by the read circuit 3 shown in FIG. 1. Reference numeral 19 in the drawing represents the first data of the serial data stream and 20 does the last data.

Figure 3:
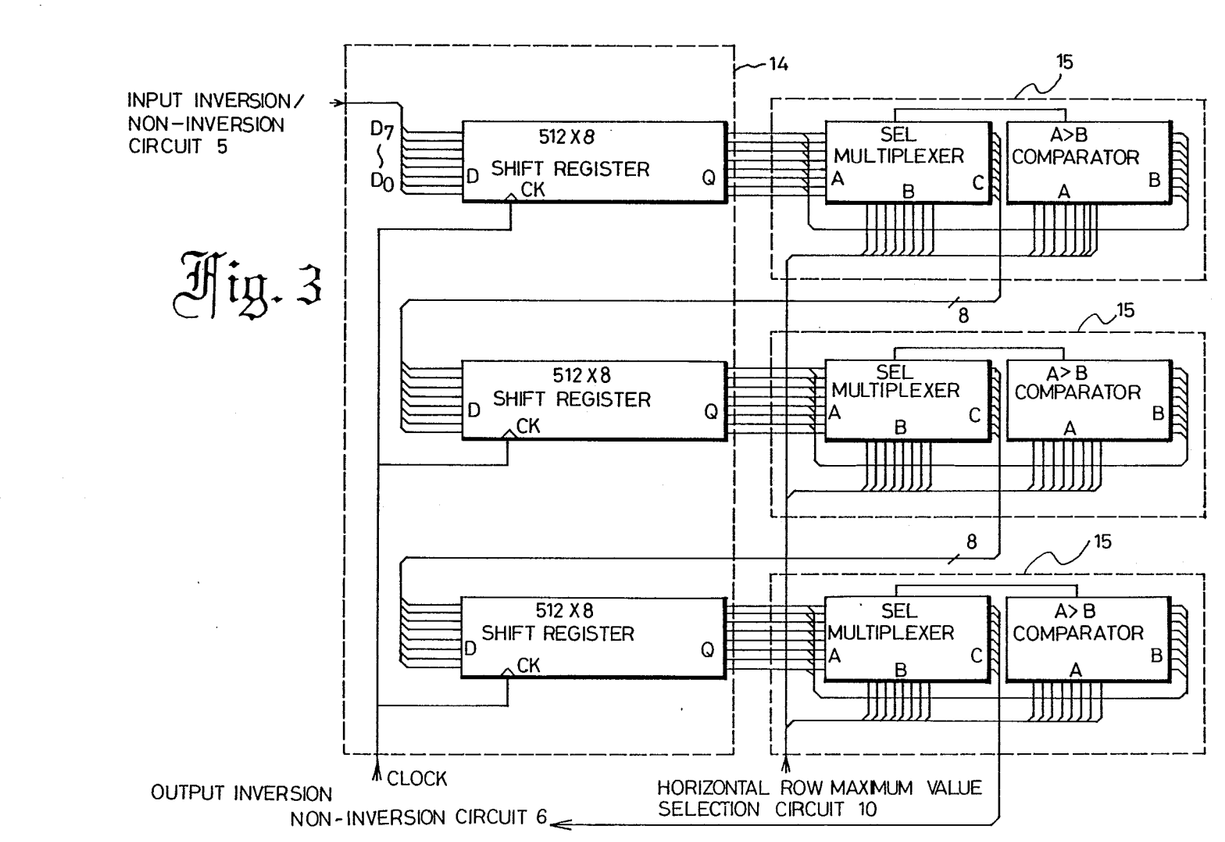
FIG. 3 shows a vertical column extraction/delay circuit and a maximum value selection circuit in the embodiment of the present invention.
Figure 4:
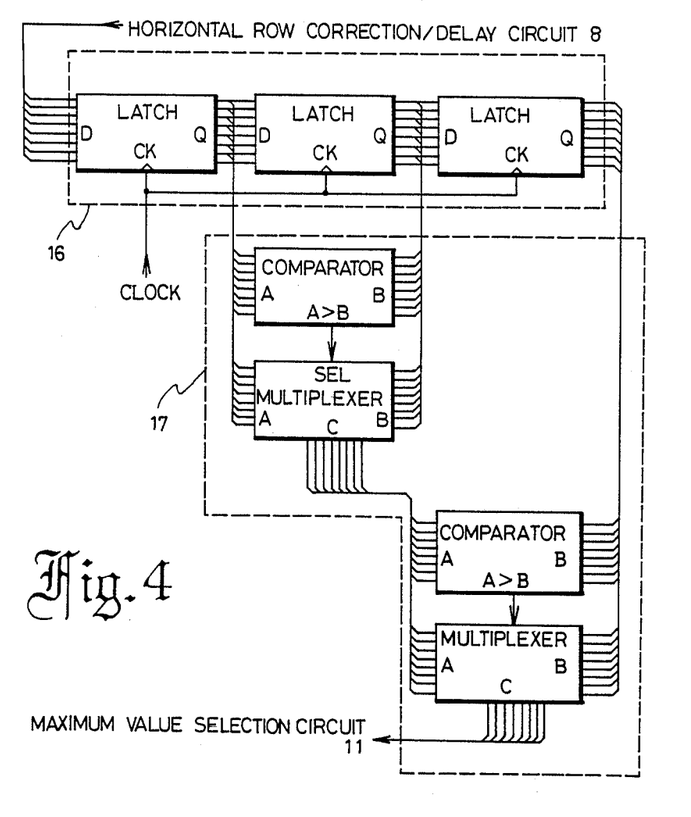
FIG. 4 shows a horizontal row extraction circuit and a horizontal row maximum value selection circuit in the embodiment of the present invention.
Figure 5:
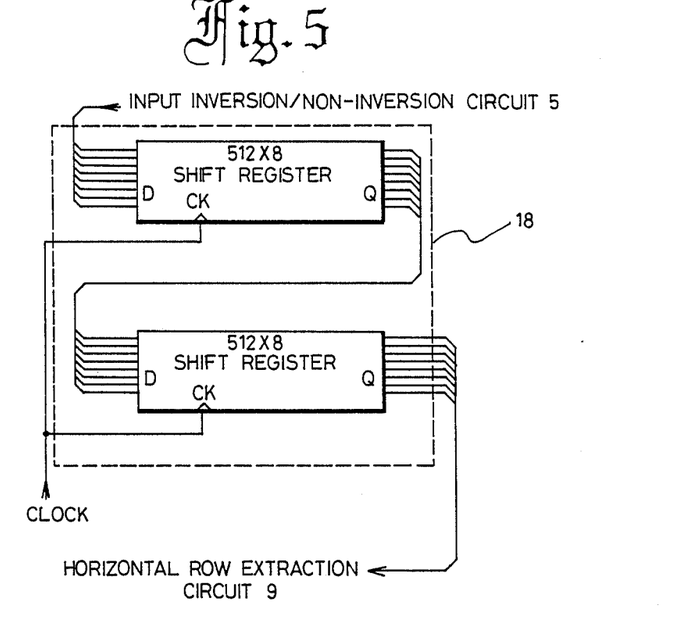
FIG. 5 shows a horizontal row correction/delay circuit in the embodiment of the present invention.
Figure 8:
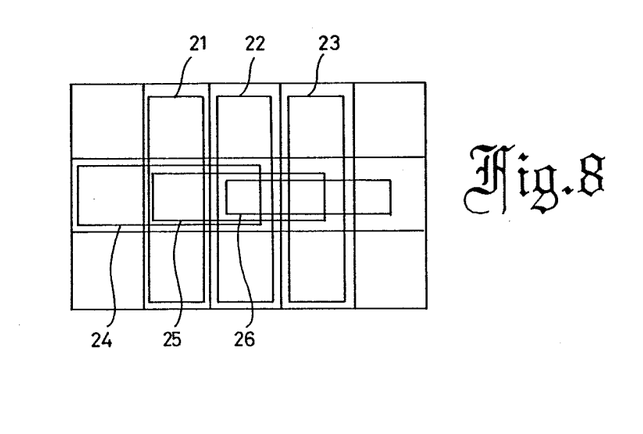
FIG. 8 shows the image correspondence between the output of the horizontal row extraction circuit and the output of the vertical column extraction/delay circuit in the embodiment of the present invention.

FIG. 8 shows the shift state of the corresponding pixel ranges held by the outputs of the vertical column extraction/delay circuit 14 of FIG. 3 and the horizontal row extraction circuit 16 of FIG. 4. Reference numerals 21, 22, 23 in the drawing represent the shift of the regions outputted by the vertical column extraction/delay circuit 14 while 24, 25, 26 represent the shift of the regions outputted by the horizontal row extraction circuit 16. Numerals 21 and 24, 22 and 25 and 23 and 26 represent the regions held by the vertical extraction/delay circuit 14 and the horizontal row extraction circuit 16 at the same timing, respectively. First of all, the regions 21 and 24 are shifted to the regions 22 and 25, and then shifted to the regions 23 and 26.

Figure 9:
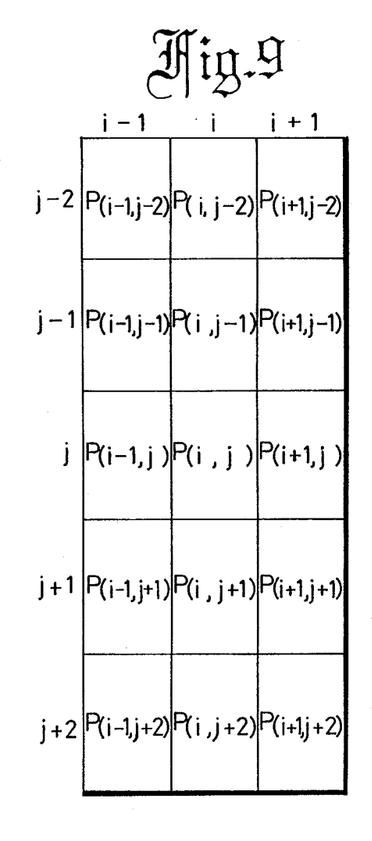
FIGS. 9 to 12 shows the conversion process 1-4 in the embodiment of the present invention.
Figure 10:
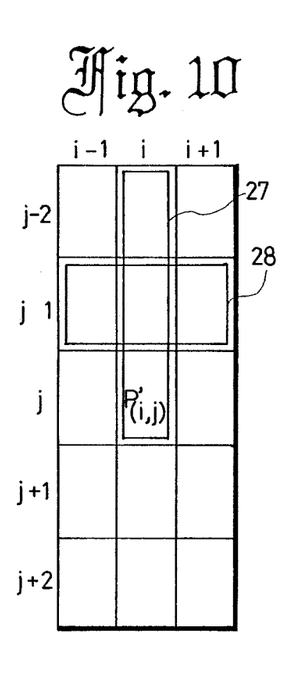

FIGS. 9 to 12 show the conversion process of an arbitrary pixel $P_{(i,j)}$ in the image memory shown in FIG. 6. FIG. 9 shows the state before conversion. FIG. 10 shows that the pixel value corresponding to $P_{(i,j)}$ is first outputted to the output of the vertical column extraction/delay circuit 14 of FIG. 3 and converted to $P'_{(i,j)}$. Here, reference numeral 27 represents the region of the image extracted by the vertical column extraction/delay circuit 14 and 28 does the region of the image extracted by the horizontal row extraction circuit 16.

$P'_{(i,j)}$ is represented by $P'_{(i,j)} = \text{MAX}(P_{(i,j)}, \text{MAX}(P_{(i-1,j-1)}, P_{(i,j-1)}, P_{(i+1,j-1)}))$.

Figure 11:
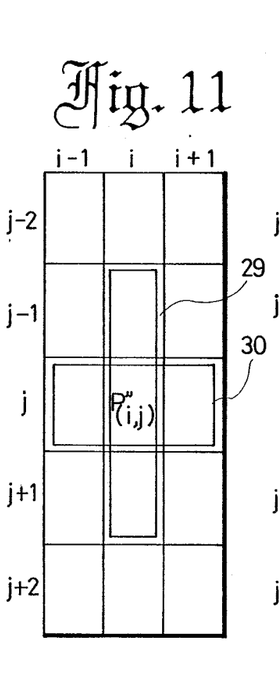

FIG. 11 shows the state of the same region after FIG. 10. Similarly, $P'_{(i,j)}$ is converted to $P''_{(i,j)}$. Reference numeral 29 in the drawing represents the region extracted by the vertical column extraction/delay circuit 14 and 30 does the region extracted by the horizontal row extraction circuit 16.

Here, $P''_{(i,j)} = \text{MAX}(P'_{(i,j)}, \text{MAX}(P_{(i-1,j)}, P_{(i,j)}, P_{(i+1,j)}))$.

Figure 12:
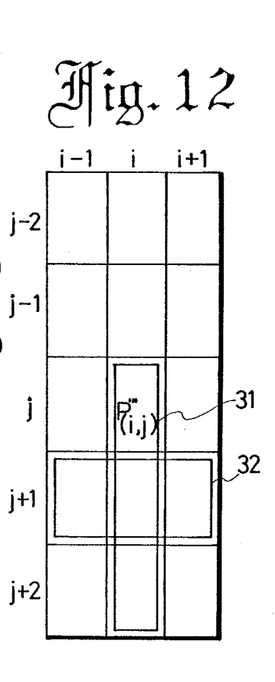

FIG. 12 shows the state of the same region after FIG. 11. Similarly, $P''_{(i,j)}$ is converted to $P'''_{(i,j)}$. Reference numeral 31 represents the region extracted by the vertical column extraction/delay circuit 14 and 32 does the region extracted by the horizontal row extraction circuit 16.

Here, $P'''_{(i,j)} = \text{MAX}(P''_{(i,j)}, \text{MAX}(P_{(i-1,j+1)}, P_{(i,j+1)}, P_{(i+1,j+1)}))$.

After conversion shown in FIG. 12, conversion of the pixel corresponding to $P_{(i,j)}$ is not effected.

Therefore, the value after conversion of $P_{(i,j)}$ becomes as follows:

$$\text{MAX}(P_{(i,j)}, P_{(i-1,j-1)}, P_{(i,j-1)}, P_{(i+1,j-1)},$$
$$P_{(i-1,j)}, P_{(i+1,j)}, P_{(i-1,j+1)}, P_{(i,j+1)},$$
$$P_{(i+1,j+1)}).$$

This means that the maximum value inside the 3×3 proximity region with $P_{(i,j)}$ being the center is made to be $P_{(i,j)}$ after conversion.

Conversion described above is made for the input serial data stream shown in FIG. 7 and the serial data stream as a result of conversion is written into the image memory 2 by the write circuit 4.

Figure 13:
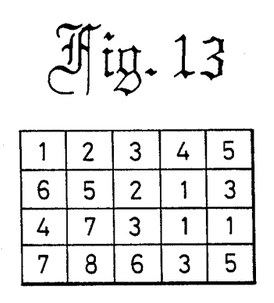
FIGS. 13 to 16 show the minimum value conversion process 1-4 in the embodiment of the present invention.

Next, the operation of the case, where the input inversion/non-inversion circuit 5 of FIG. 1 and the output inversion/non-inversion circuit 6 of FIG. 1 are controlled so as to perform the inversing operation, will be described with reference to the drawings FIG. 13 shows an example of pixel values of the image memory such as shown in FIG. 6 which has an arbitrary 4-row by 5-column small region.

Figure 2:
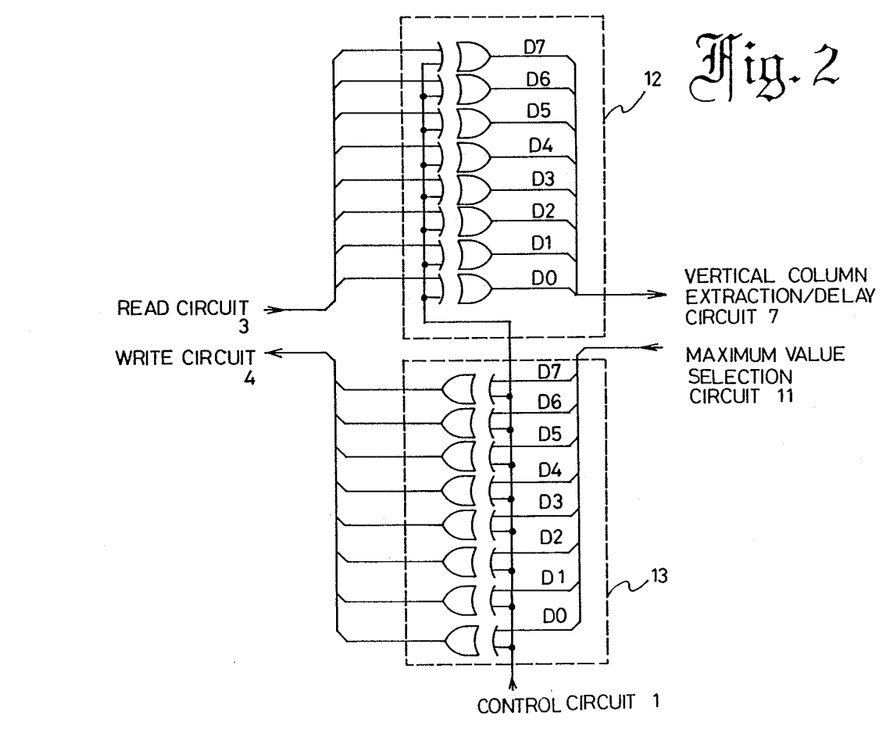
FIG. 2 shows an input inversion/non-inversion circuit and an output inversion/non-inversion circuit in the embodiment of the present invention.
Figure 14:
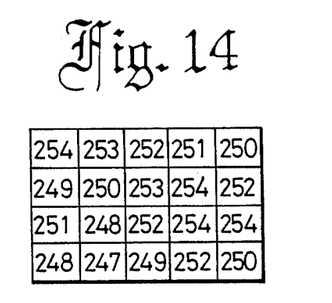

FIG. 14 shows the serial data stream value inversed by the input inversion/non-inversion circuit 12 of FIG. 2, as the corresponding regions of the image memory.

Figure 15:
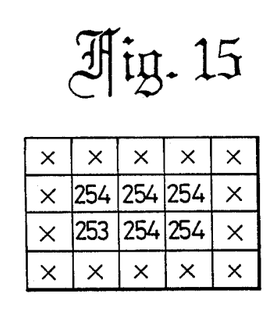

FIG. 15 shows the serial data stream value after maximum value conversion, as the corresponding regions of the image memory.

Figure 16:
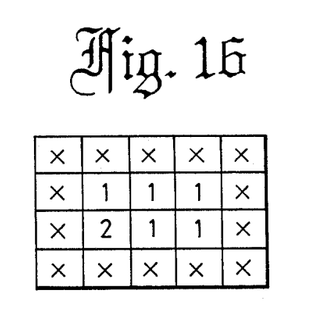

FIG. 16 shows the state where the series data after conversion is inversed by the output inversion/non-inversion circuit and written into the image memory.

Symbol X in FIGS. 15 and 16 represent "indefinite" because the value is determined by a surrounding value outside this region.

FIG. 16 shows that minimum value conversion can be made by inversing logically the input serial data stream by the input inversion/non-inversion circuit 12 of FIG. 2 and then inversing logically the serial data stream after maximum conversion by the output inversion/non-inversion circuit 13 of FIG. 2 so that the minimum value in the 3×3 proximity region can be set to the center pixel eventually.

As described above, the present invention can accomplish the maximum/minimum value conversion of the image by a relatively simple circuit construction. Therefore, when compared with the prior art having the same circuit scale, a conversion circuit for a greater proximity region can be constituted.

What is claimed is:

1. In a maximum/minimum value conversion circuit for image processing comprising:
   image memory for storing image data representing an image made up of pixels in the form of a matrix composed of a plurality of horizontal rows and vertical columns of the pixels;
   read means coupled to said image memory means for sequentially reading out the image data from said image memory means and converting the image data into a serial data stream composed of a plurality of multi-bit words each constituting the image data of one of the pixels of the image;
   horizontal row extraction means connected to receive the serial data stream for extracting, from the serial data stream, image data associated with a portion of predetermined length of a horizontal row of the matrix;
   horizontal row maximum value selection means coupled to said horizontal row extraction means for selecting the maximum value image data from among the data extracted by said horizontal row extraction means;
   vertical column extraction/delay means connected to receive the serial data stream for sequentially extracting, from the serial data stream, image data associated with a portion of predetermined length of a vertical column of the matrix;
   a plurality of additional maximum value selection means each connected for comparing the data extracted by said vertical column extraction/delay means with the data selected by said horizontal row maximum value selection means and selecting and outputting the maximum value from among the compared data; and
   write means coupled to said image memory means for sequentially writing the data selected by one of said additional maximum value selection means into said image memory means.

2. A maximum/minimum value conversion circuit for image processing according to claim 1 further comprising:
   first selective data value inversion means coupled between said read means and said vertical column extraction/delay means and controllable for selectively inverting the value of the data read from said image memory means; and
   second selective data value inversion means coupled between said write means and said one of said additional maximum value selection means, and controllable for selectively inverting the value of the output data of said one additional maximum value selection means.

3. A maximum/minimum value conversion circuit for image processing according to claim 1, wherein said image memory means comprises R rows × C columns of memory elements constituting a two dimensional matrix of memory elements, each element storing a data word composed of B bits and corresponding to the intensity of a corresponding pixel, where R, C and B are integers.

4. A maximum/minimum value conversion circuit for image processing according to claim 1, wherein each word in the data stream is composed of B bits and said vertical column extraction/delay means comprises a plurality of R stages, each stage containing a B bit shift register, each shift register shifting every B bit word by one word simultaneously in response to a common shift clock signal, one of said shift registers being connected to receive the serial data stream and the other ones of said shift registers being connected to receive the outputs of said plurality of additional maximum value selection means respectively, and every shift register outputting a B bit word to said plurality of additional maximum value selection means simultaneously.

5. A maximum/minimum value conversion circuit for image processing according to claim 4 wherein each said additional maximum value selection means comprises: a magnitude comparator having a first B bit word input connected to receive the data words outputted by a respective shift register of said vertical column extraction/delay means and a second B bit word input connected to receive the words constituting the data selected by said horizontal row maximum value selection means, said comparator being operative for comparing the words simultaneously received at said first and second inputs; and a multiplexer having two B bit word inputs each connected to a respective input of said comparator, and a B bit word output for supplying a selected one of the words at said inputs in response to the comparison result produced by said comparator.

6. A maximum/minimum value conversion circuit for image processing according to claim 1 wherein each word in the data stream is composed of B bits and said horizontal row extraction means comprise a plurality of single stage, B bit latches connected serially, with one of said latches being connected for receiving the serial data stream and each of said latches having an output connected for supplying successive data words to said horizontal row maximum value selection means.

7. A maximum/minimum value conversion circuit for image processing according to claim 1 wherein each word in the data stream is composed of B bits and said horizontal row maximum value selection means comprise: a plurality of magnitude comparators each having two B bit word inputs connected to receive two words constituting image data extracted by said horizontal row extraction means and each operative for comparing the words simultaneously received at said inputs; and a plurality of multiplexers each having two B bit word inputs each connected to a respective input of a respective comparator, and a B bit word output for supplying a selected one of the words at said multiplexer inputs, with the output of one of said multiplexers being connected for supplying to each of said additional maximum value selection means the word constituting the maximum value image data extracted by said horizontal row extraction means.

* * * * *